United States Patent [19]
Bellows et al.

[11] Patent Number: 5,132,920
[45] Date of Patent: Jul. 21, 1992

[54] AUTOMATED SYSTEM TO PRIORITIZE REPAIR OF PLANT EQUIPMENT

[75] Inventors: James C. Bellows, Maitland; Robert L. Osborne; Avelino J. Gonzalez, both of Winter Springs, all of Fla.; Christian T. Kemper, Silver Spring, Md.

[73] Assignee: Westinghouse Electric Corp., Pittsburgh, Pa.

[21] Appl. No.: 156,064

[22] Filed: Feb. 16, 1988

[51] Int. Cl.$^5$ .......................... G06F 15/20; G06G 7/54
[52] U.S. Cl. .............................. 364/551.01; 364/492; 364/138; 376/245; 395/100
[58] Field of Search ................ 364/200, 424.03, 506, 364/580, 551.01, 138, 492, 513, 900, 550; 235/151.3; 371/18, 28, 29

[56] References Cited

U.S. PATENT DOCUMENTS

| | | | |
|---|---|---|---|
| Re. 31,247 | 5/1983 | Johnstone | 364/138 |
| 3,678,256 | 7/1972 | Harenberg, Jr. | 364/424.03 |
| 3,873,817 | 3/1975 | Liang | 364/506 |
| 4,234,926 | 11/1980 | Wallace et al. | 364/138 |
| 4,383,298 | 5/1983 | Huff et al. | 364/200 |
| 4,517,468 | 5/1985 | Kemper et al. | 364/492 |
| 4,599,692 | 7/1986 | Tan et al. | 364/900 |
| 4,642,782 | 2/1987 | Kemper et al. | 364/554 |
| 4,644,479 | 2/1987 | Kemper et al. | 364/550 |
| 4,649,515 | 3/1987 | Thompson et al. | 364/900 |
| 4,698,756 | 10/1987 | Gonzalez et al. | 364/557 |
| 4,701,845 | 10/1987 | Andreasen et al. | 364/200 |
| 4,703,446 | 10/1987 | Momose | 364/580 |
| 4,719,587 | 1/1988 | Berte | 364/550 |
| 4,729,124 | 3/1988 | Hansel et al. | 371/18 |
| 4,771,427 | 9/1988 | Tulpule et al. | 371/36 |

FOREIGN PATENT DOCUMENTS 3276 1/1986 Japan.

OTHER PUBLICATIONS

Mark S. Fox, "Techniques for Sensor-Based Diagnosis", May 14, 1983, pp. 1-12, Pittsburgh, Pa.

*Primary Examiner*—Parshotam S. Lall
*Assistant Examiner*—V. Trans

[57] ABSTRACT

The system of the present invention uses the importance of a piece of malfunctioning equipment, the severity and the confidence level in a diagnosis to determine repair priority of the equipment by obtaining the product (46) of the confidence level (CF), importance (IMP) and severity (SEV). The these variables are determined by expert system rules. The severity is the reciprocal (88) of the time to failure. The importance (44) is the cost to repair the maximum damage when the malfunction continues. A malfunction can affect several pieces of equipment in combination, the severity and importance associated with each piece is combined (70) with the confidence and used to determine the repair priority. When the diagnosis of a malfunction is by malfunctioning sensors, the expected equipment life (40) and the availability (86) of sensors that provide a partial backup are considered in prioritizing sensor as well as equipment repair. When a primary piece of equipment is backed up (100), the effect of both pieces of equipment failing (106) is considered in prioritizing the repair. The system ranks the repair of all possible malfunctions on a common scale. The system gives a complete repair priority picture and allows the cost effectiveness to be maximized.

13 Claims, 5 Drawing Sheets

AUTOMATED SYSTEM TO PRIORITIZE REPAIR OF PLANT EQUIPMENT

BACKGROUND OF THE INVENTION

1. Field of the Invention

This present invention is directed to a system which prioritizes repair of equipment in a complex integrated plant such as a nuclear or fossil fuel power plant and, more particularly, the present invention uses a common scale to determine the priority of repair of all equipment in the plant, including sensors and backup equipment, taking into account the confidence level in the malfunction being diagnosed, the potential consequential damage caused by the malfunction and the severity or rate at which damage is occurring.

2. Description of the Related Art

Conventional diagnostic software, as illustrated in FIG. 1, determines what piece of equipment in a plant is malfunctioning with a malfunction defined as when an object or process is not functioning as needed or desired. Artificial intelligence systems, as depicted in the block diagram of FIG. 1, take sensor data 10 and determine 12 whether the sensor data is valid by comparing the sensor data to thresholds, other limits and internal consistency relationships. Once the validity of the sensor data is determined, the sensor data is interpreted 14 with respect to the physical meaning of the sensor data within the context of the plant being monitored. The data, validity and interpretations are combined to yield validated interpretations which define a plant state. Next the system diagnoses 16 the malfunctions and determines the confidence level in these malfunctions from the plant state. Current practice is to order the list of malfunctions based on confidence level. This conventional diagnostic system depicted in FIG. 1 is described in U.S. Pat. No. 4,644,479 incorporated by reference herein.

In actual practice the sorting based on confidence level usually places the malfunctioning sensors at the top of the list. Since the sensors are not worth shutting down the plant to repair, the plant operators generally ignore the malfunctions with the highest confidence level. As a result the malfunctions with the highest confidence have the lowest priority to an operator. Because of this problem, the operator scans down the list until he finds a malfunction which is significant to the continued operation of the plant. The problem is complicated because the most important malfunctions may be very far down on the list and may be missed. The operator is generally trying to determine how bad the malfunction is hurting the plant. This determination is made subjectively based on plant history and the experience of the operator. The operator makes, after reviewing the malfunction, a decision as to whether the malfunction and the associated equipment should be repaired. Because this approach to scheduling equipment repair is highly subjective a need has arisen for a system that automatically determines relative value of competing equipment repair options and takes into consideration the many factors normally considered by the operator such as the cost of an outage to fix the malfunctioning equipment verses the damage caused by allowing the malfunction to continue.

SUMMARY OF THE INVENTION

It is an object of this invention to weigh the cost of fixing a malfunction against the cost of allowing the malfunction to continue until scheduled repairs, so that the cost effectiveness of a system will be maximized.

It is an additional object of the present invention to prioritize the repair of equipment, backup equipment and sensors on a common scale, so that the most important item is repaired first.

It is another object of the present invention to allow comparison of all malfunctions even when the malfunctions are occurring in radically different systems such as a chemical corrosion problem in the feedwater system and an electrical generator malfunction.

It is an additional object of the present invention to prioritize repair of a malfunction to balance the cost of an outage to repair the equipment versus the cost of repair if the malfunction is allowed to continue including the cost of repair, down time and other consequential damage.

It is a further object of the present invention to prioritize repair of a primary piece of equipment that includes a backup.

It is still another object of the present invention to prioritize repair of sensor based on the availability of other sensors that supply partial backup for the malfunctioning sensor.

The above objects can be attained by a system that uses history and experience concerning the importance of an outage associated with a piece of equipment, the rate of damage caused by the continuing malfunction (the severity) and the confidence level in the malfunction diagnosis to determine the priority of repair of the piece of equipment. Because a malfunction can affect several pieces of equipment in combination, the severity and importance associated with each piece of equipment is combined and used to determine the repair priority. When the diagnosis of a malfunction is limited by malfunctioning sensors, the expected life of the equipment and the availability of sensors that provide a partial backup to the malfunctioning sensors are considered in prioritizing sensor as well as monitored equipment repair. When a primary piece of equipment is backed up, the effect of both pieces of equipment failing is considered in prioritizing the repair of the backup. The result is a system that ranks the repair of all possible malfunctions on a common scale even when disparate malfunctions are occurring. The system gives a complete repair priority picture of a complex system and allows the cost effectiveness of the system being monitored to be maximized.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
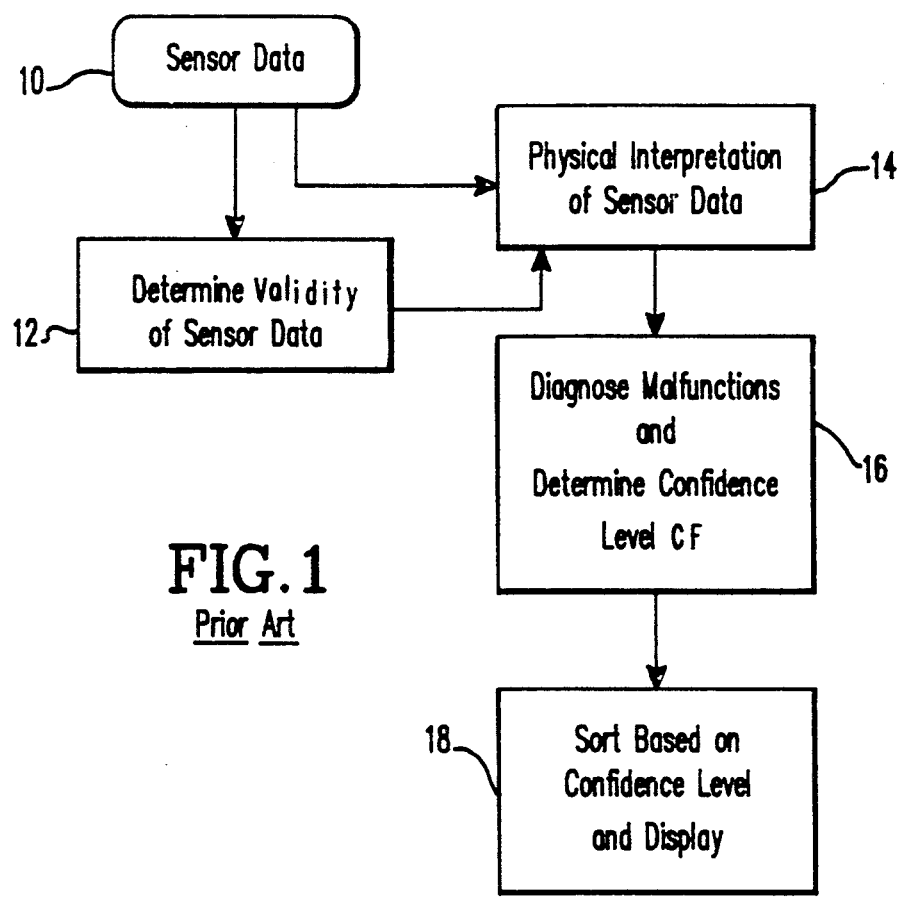
FIG. 1 is a block diagram of a prior art artificial intelligence system that diagnoses malfunctions and ranks the malfunctions in accordance with the confidence level of each diagnosis.

For most malfunctions, an estimate can be made of the maximum consequential damage which will occur if the malfunction is allowed to continue until the piece of equipment or component fails completely. The maximum consequential damage is designated the importance (IMP), is usually a constant and takes into account the length of time of an outage necessary to repair the maximum consequential damage caused by the malfunction along with the direct cost of repair. The time frame of the outage is also taken into consideration in evaluating the importance of the malfunction, so that malfunctioning items which can be repaired during an upcoming, regularly scheduled outage assume less importance. For example, if an outage is scheduled in a week and there is something that needs to be repaired within two weeks, it is inefficient to take a forced outage. This decision would be implemented in the preferred system discussed in more detail hereafter by two rules:

$$(\text{not } (1/SEV << \text{time till outage}))$$

$$(1/SEV << \text{time till outage})$$

These two rules are control expressions that reside in context slots in the preferred expert system program. A rule fires only when the context of the rule is true. For the above two rules the context is true for one rule when the context is false for the other rule. The first rule will pass the calculated severity as the malfunction severity, if a scheduled outage is not close enough in time. The second rule will pass a severity of zero, if the outage is close enough in time.

It is possible to diagnose an important malfunction with great confidence while the malfunction is of a low priority because the severity of the malfunction is low. The severity (SEV) of a malfunction is defined as the reciprocal of the time before the maximum consequential damage is expected to occur. This is generally the rate at which specific damage to the system is occurring. The severity is not a constant but is dependent on the state of one or more variables in a system and must be independently calculated based on those variables. For example, if the malfunction being diagnosed is worn out brakes on a car, the actual condition of the brakes is one part of the severity determination and the speed at which the car is travelling is another consideration.

It is also possible for an important malfunction of great severity to have a low priority, if the confidence level (CF) in the malfunction is very low. In a simple case the priority of repair of a piece of equipment is the product of the confidence level (CF), the importance (IMP) and the severity (SEV).

The present system determines the priority of all malfunctions on a common scale, so that malfunctions associated with different types of equipment can be compared. This is specifically important in the case of a chemistry malfunction verses a generator malfunction. In current practice, a chemistry malfunction in a power plant does not pose an immediate threat of failure even though the damage may result, in the worst case, in the costly and premature rebuilding of a boiler resulting in a 6 to 9 month outage two years after the chemistry malfunction. The damage caused by a chemistry malfunction can occur in a short time, but it is residual. Boiler walls may be weakened within a few days but the weakening may only become intolerable after a significant period of time. The prioritization scheme of the present invention will enable comparison for instance, of a boiler outage to the potential outage due to damage to a bearing in the generator caused by dirty lubricating oil.

In the case of a malfunctioning sensor, the importance of the malfunction is the maximum consequential damage that will occur, however, the damage is computed based on the difference between the worst failure that could occur due to the lack of data caused by the malfunctioning sensor and the smallest amount of damage or outage which would occur if the system were brought down to repair the equipment based on this particular sensor if it were functioning properly. If the maximum consequential damage to equipment when the sensor fails to signal a condition because the sensor is malfunctioning is DAMMAX; and the minimum damage that will occur if the sensor is properly functioning, the sensor alerts the operator and the operator takes the equipment of line is DAMMIN; then the sensor importance IMP=DAMMAX−DAMMIN. The severity of a malfunctioning sensor can be divided into simple and complex cases.

In the simple case, if the malfunctions being monitored that are dependent on the malfunctioning monitor can be diagnosed without the malfunctioning sensor, the severity is simply a function of the lost confidence in those malfunctions. If the sensor supports diagnosis of a malfunction which cannot otherwise be diagnosed, the severity is determined from the time (mean time) until the occurrence of the malfunction.

In the more complex case, the actual likelihood that the plant malfunction exists is factored into the severity of the sensor failure. This can occur in two situations.

The first situation occurs when there is a backup sensor with a similar function at a different location. An example of this situation is a sodium sensor on the polisher effluent for the feedwater at a plant with condensate polishers. The final feedwater sensor backs up the polisher effluent sensor because any sodium in the polisher effluent will pass through the feedwater sensors. In this situation, the feedwater sensor can suggest that the condensate polisher is not retaining sodium. The severity of a malfunction of the polisher effluent sodium sensor is related to the feedwater sodium concentration. If it is low, the loss of the sodium sensor at the polisher effluent does not harm the diagnosis, and is therefore low in severity. As the feedwater sodium concentration increases, the severity of the malfunction of the sodium sensor on the polisher effluent increases.

In the second situation, there is no sensor with a similar function at a different location to backup the malfunctioning sensor. The condensate sodium sensor on a plant with condensate polishers is an example of such a sensor. Immediately after this sensor in the fluid stream one can expect a change in sodium concentration in the water, hence downstream sensors should indicate a different concentration. In this situation the other sensors on the condensate are used to indicate that something is happening in the condensate. If nothing is happening, the mean time until a condenser leak occurs or a contaminated makeup is introduced is used to compute the severity. If, however, the other monitors indicate that sodium conditions are changing, the severity of sodium monitor malfunction increases. The results of manual determination of the sodium in the condensate may also be used to modulate the severity. If the manual results are high, there is a real need for the monitor in the continuing evaluation of the undesirable situation. If the results are low, the monitor is not necessary.

In the case of a failure of a component for which there is a backup system, the importance is the consequential damage that will occur if the primary and backup systems fail simultaneously. The severity would normally use the estimate of the mean time until failure of the backup system unless there is a way to diagnose the backup system. If a diagnosis of the backup system is present, the severity is determined using the expected time to failure of the backup system. In the case of multiple backup systems, the severity is the reciprocal of the sum of the mean time to failure of each backup system.

Figure 2:
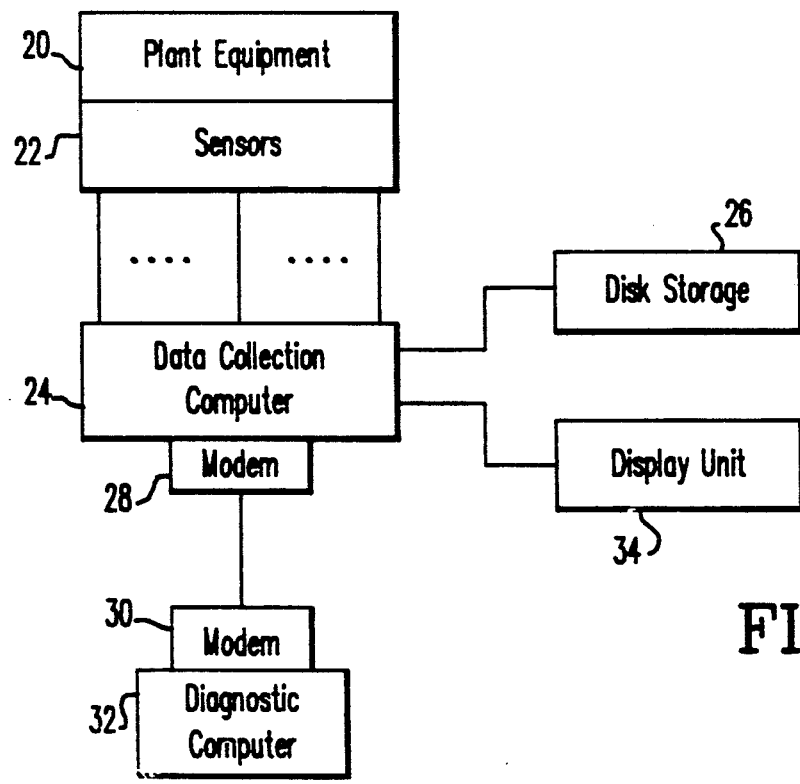
FIG. 2 depicts hardware of a diagnostic system of the present invention.

FIG. 2 illustrates a typical equipment configuration which can be used by the present invention, the details of which can be obtained from U.S. Pat. No. 4,517,468 incorporated by reference herein. The plant equipment 20 is monitored by sensors 22 which communicate digital as well as analog data to a data collection computer 24. The computer 24 periodically and continually collects sensor data and stores same in a disc storage unit. The data collection computer 24 is typically a Digital Equipment Microvax II. Periodically the data collection computer either automatically or after being polled sends data through modems 28 and 30 to diagnostic computer 32 which is typically a Digital Equipment Vax 8500 series computer. The diagnostic computer 32 diagnoses the malfunctions for several different data collection computers 24 and returns the prioritized malfunctions to the respective data collection computer 24. The data collection computer 24 displays the list on the display unit 34 and the plant operators initiate repairs.

The diagnostic computer is preferably executing an expert system program that uses knowledge representations and inference procedures to reach diagnostic conclusions. Many expert systems are available which will accomplish the goals of the present invention, however, the preferred system is PDS (Process Diagnosis System) described in the proceedings of the Eighth International Joint Conference on Artificial Intelligence, Aug. 8-12, 1983, pp. 158-163 incorporated by reference herein. The PDS system is available from Westinghouse and a detailed description of the system can be found in U.S. Pat. No. 4,649,515, incorporated by reference herein. An example of the use of this system to diagnosis malfunctions can be found in U.S. Pat. No. 4,644,479 incorporated by reference herein. Packages specifically for generators (GENAID), turbine (TURBINAID) and chemical (CHEMAID) malfunctions which perform the functions of the prior art described previously with respect to FIG. 1 are also available from Westinghouse for fossil power plants.

In the PDS system, as well as other expert systems, for each rule there is evidence as well as a consequence (hypothesis) of that evidence. In PDS evidence is linked to a hypothesis by a rule with the evidence and hypothesis constituting nodes of the system. Associated with each node (hypothesis) is a measure of belief as well as a measure of disbelief which both range on a scale from 0 to 1. The difference between the measure of belief and the measure of disbelief yields a confidence factor (CF) which ranges from $-1$ to $+1$ where more positive numbers indicate that the hypothesis is likely true. Experts in the various fields associated with the plant equipment being monitored establish the various rules and relationships which are stored in the diagnostic computer memory. For example, an expert on generator failures would produce each rule and hypothesis for generator failures while a chemical engineer would produce each rule and hypothesis for plant chemistry malfunctions. The expert would also provide the data associated with the costs of outage and repair as well as the data on mean time until failure of equipment that is malfunctioning.

The expert's belief in the sufficiency of a rule can also be considered by PDS, represents the experts opinion on how the evidence supports the hypothesis and is designated as a sufficiency factor where positive values of the sufficiency factor denote that the presence of evidence suggests that the hypothesis is true. The PDS expert system can also utilize the experts belief in the necessity of the rule which indicates to what degree the presence of the evidence is necessary for the hypothesis to be true. The necessity belief is designated as a necessity factor. During the more detailed discussion of the present invention which will follow examples of complex rules for a power plant will be provided and a person of ordinary skill in the expert system implementation art can adapt the examples to other situations and other types of equipment being monitored.

Figure 3:
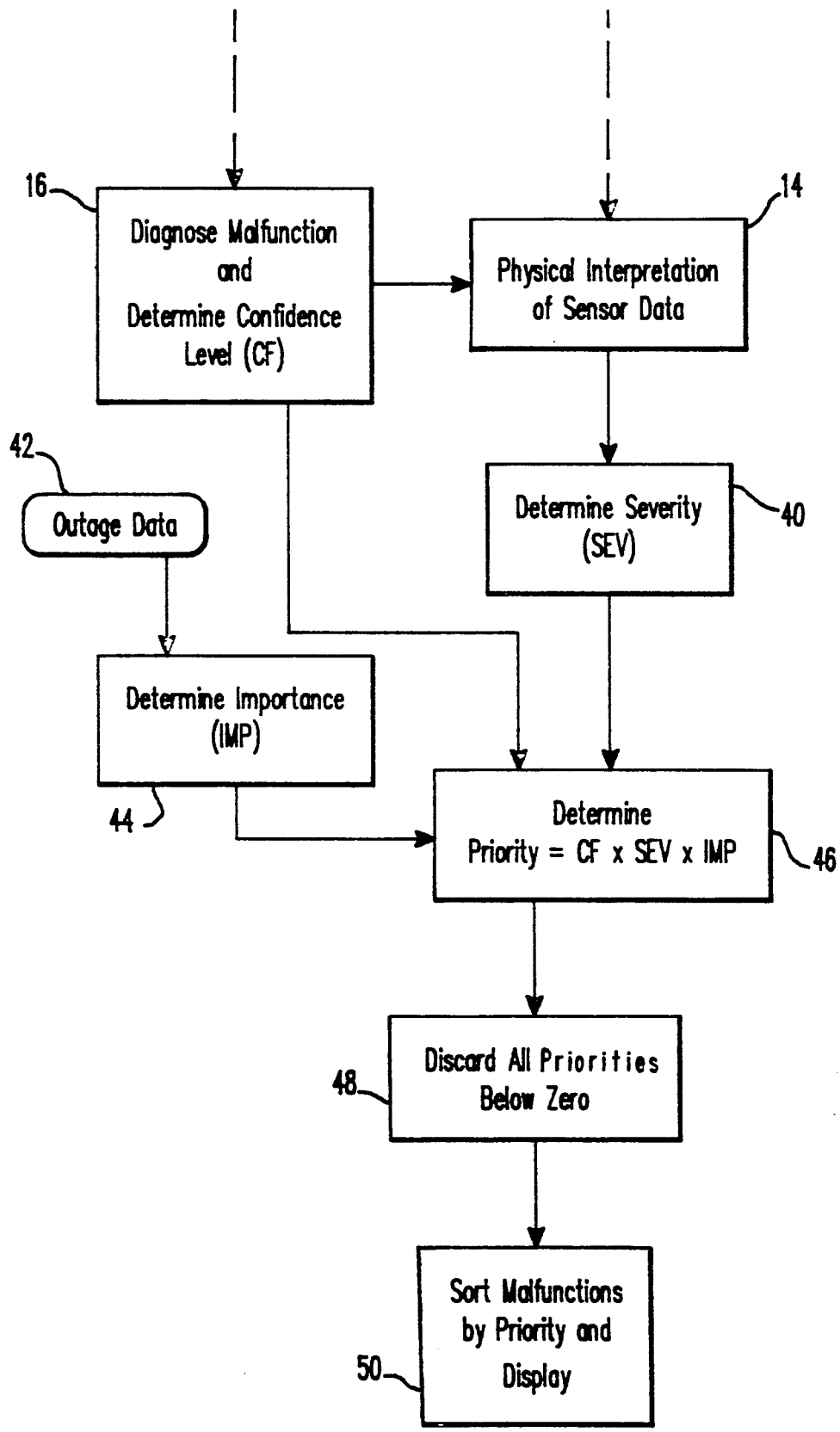
FIG. 3 illustrates an equipment prioritization portion of the system in accordance with the present invention and how the present invention interfaces with the prior art.

FIG. 3 illustrates the prioritization of simple equipment malfunctions. The confidence level (CF) in a malfunction, for example, the malfunction of a condensate polisher by anion resin exhaustion is determined 16 by a prior art system such as described in U.S. Pat. No. 4,644,479. An example of a pair of rules which determines the confidence level of such a malfunction is illustrated below.

| CONTEXT: | always |
|---|---|
| EVIDENCE: | polisher-eluting-anions |
| HYPOTHESIS: | anion-resin-exhausted |
| SF: | 0.7 |
| NF: | 0.5 |
| DESCRIPTION | polisher eluting anions probably has exhausted anion resin |
| CONTEXT: | always |
| EVIDENCE: | anions-PE> =anions-C* |
| HYPOTHESIS: | polisher-eluting-anions |
| SF: | 0.8 |
| NF: | 0.2 |
| DESCRIPTION: | more anions in effluent than influent to polishers implies that polisher is eluting anions |

The evidence for this rule is obtained from the cation conductivity readings on the condensate (polisher influent) and the polisher effluent. The prior art portion of the system which interprets 14 sensor data is also used. An example of a rule which interprets sensor data from a pH meter which will be used to determine 40 the severity of the malfunction associated with this piece of equipment is illustrated below.

| CONTEXT: | always |
|---|---|
| EVIDENCE: | ( times ( > sen-mal-pH-B O sf- |

|  | -continued |
|---|---|
|  | evaluation ) ( div 1 ( exp ( times 2.303 (add 11.2 ( times PHXB −4.18 ) ( times PHXB PHXB 0.376 ) ) ) ) ) ) |
| HYPOTHESIS: | H2-embrit-sev |
| SF: | 0 |
| NF: | 0 |
| DESCRIPTION: | formula for hydrogen embrittlement severity to calculate the severity |

This a rule that calculates the severity of hydrogen embrittlement which will ultimately be used to calculate the severity for anion-resin-exhausted. The underlined part in the evidence is a formula to estimate the severity of hydrogen embrittlement. The non-underlined part modulates the severity by the belief that the sensor used in the calculation has gone bad. The function sf-evaluation is 1 for input <0.3 and declines to 0 at input=0.7.

As previously discussed, the severity (SEV) takes into account the rate of damage to the equipment due to the particular malfunction and is the reciprocal or inverse of the expected time to the maximum consequential damage or total failure. An example of a rule which will calculate the severity of the condensate polisher set malfunction is set forth above since it is equivalent to determining hydrogen embrittlement severity. Severity is normally computed by determining the expected time to failure. This determination is based on whatever instrument readings may be appropriate. In this example, the pH of the drum blowdown is the most important sensor for determining the severity of the condensate polisher anion resin exhaustion. The rule, contains a formula for converting the blowdown pH, PHXB, to an expected time till failure of a boiler tube.

In many cases, data from which to derive formulas for expected time to failure do not exist. Most data sources have averaged data in ways which mask the details which sensors could provide and therefore provide only crude estimates of time to failure of the equipment. Consultation with experts by describing possible situations and asking for an estimate of the time to failure can be successfully used by one of ordinary skill in the art to develop an approximation to appropriate data where detailed data is not available. The data may then be analyzed by multiple regression techniques to determine the formulas for mean time to failure.

In other situations severity must be computed as the reciprocal of time til the last chance to take action. Such a situation occurs in a rocket launch with solid fuel rockets. The last chance to take action is just before ignition. The disaster may occur minutes later. In this case, the severity must be computed in a special way. Before the last time to take action, the severity is determined by taking the reciprocal of the time until the last chance to take action. After the last chance to action, the priority is computed in the normal way as the reciprocal of the expected time to failure.

Outage data 42 which includes the length of time for an outage, the cost associated with the outage and cost of repair are used to determine 44 the importance (IMP) of the particular malfunction. In a power plant it is typical for the importance to be the outage time for the plant times the lost revenue associated with the outage. Typical outage times for equipment in an electric power plant can be found in NERC Generating Availability Data System Reports from the National Electric Reliability Council. These reports contain outage time information weighted by unit size and reported in megawatt hours. Outage averages can be determined by a person of ordinary skill using the average unit size in a group. Special reports are also available from the NERC which provide outages correlated to cause of the outage. Outage time for other types of systems can be obtained by one of ordinary skill from qualified experts. Other factors such as the cost of repair are very much smaller than the outage cost in a power plant. On the other hand, when a blown head gasket in an automobile is the malfunction, the importance is the cost of renting a replacement vehicle (the outage time) for two days plus the cost of replacing the head gasket (the cost of repair). In this situation, the costs of repair swamps the outage time. An example of a rule which will determine the importance of turbine blade corrosion which may contribute to the importance of a polisher malfunction is set forth below.

| CONTEXT: | always |
|---|---|
| EVIDENCE: | ( < spare-rotor-in-plant O sf-importance-blade-corrosion-r1 ) |
| HYPOTHESIS: | importance-blade-corrosion |
| SF: | 0 |
| NF: | 0 |
| DESCRIPTION: | if spare rotor is ready for installation, importance is exchange time plus 1 day ( equivalent repair cost ) ; if not, importance is length of reblading outage. |
| DATA: | ( 0 30 0.5 30 0.51 8 1 8 ) |

The above rule passes 0 or 1 (no or yes) from spare-rotor-in-plant (assumed ready to install) through sf-importance-blade-corrosion-r1 to produce 30 or 8 days of importance. There is an alternative way to do this by two rules and selection based on the value of spare-rotor-in-plant but it is less efficient.

Once the importance (IMP), severity (SEV) and confidence factor (CF) have been determined the priority can be determined 46 as the product of the confidence (CF), importance (IMP) and the severity (SEV). Once the priority of each malfunction is determined all priorities and malfunctions with a priority below 0 are discarded 48 since the malfunction does not exist when the priority is below 0. Then the malfunctions are sorted 50 in accordance with the priority and displayed to the operator.

When several malfunctions affect the same piece of equipment, the severity will be inclined to be the same for all of them. The severity of a malfunction is determined by sensors around the equipment suffering consequential damage. If two malfunctions combine to make a severe condition, the severity will be assigned to both of them. For example, high condensate oxygen and high ammonia concentration (high pH) combine to produce rapid corrosion of copper alloys in feedwater heaters. (The ultimate damage is due to deposits in the boiler.) Correcting either of the causal conditions will reduce the corrosion rate. The severity is determined by the rate of corrosion as estimated from the combined data on oxygen 1 and ammonia concentrations.

Figure 4:
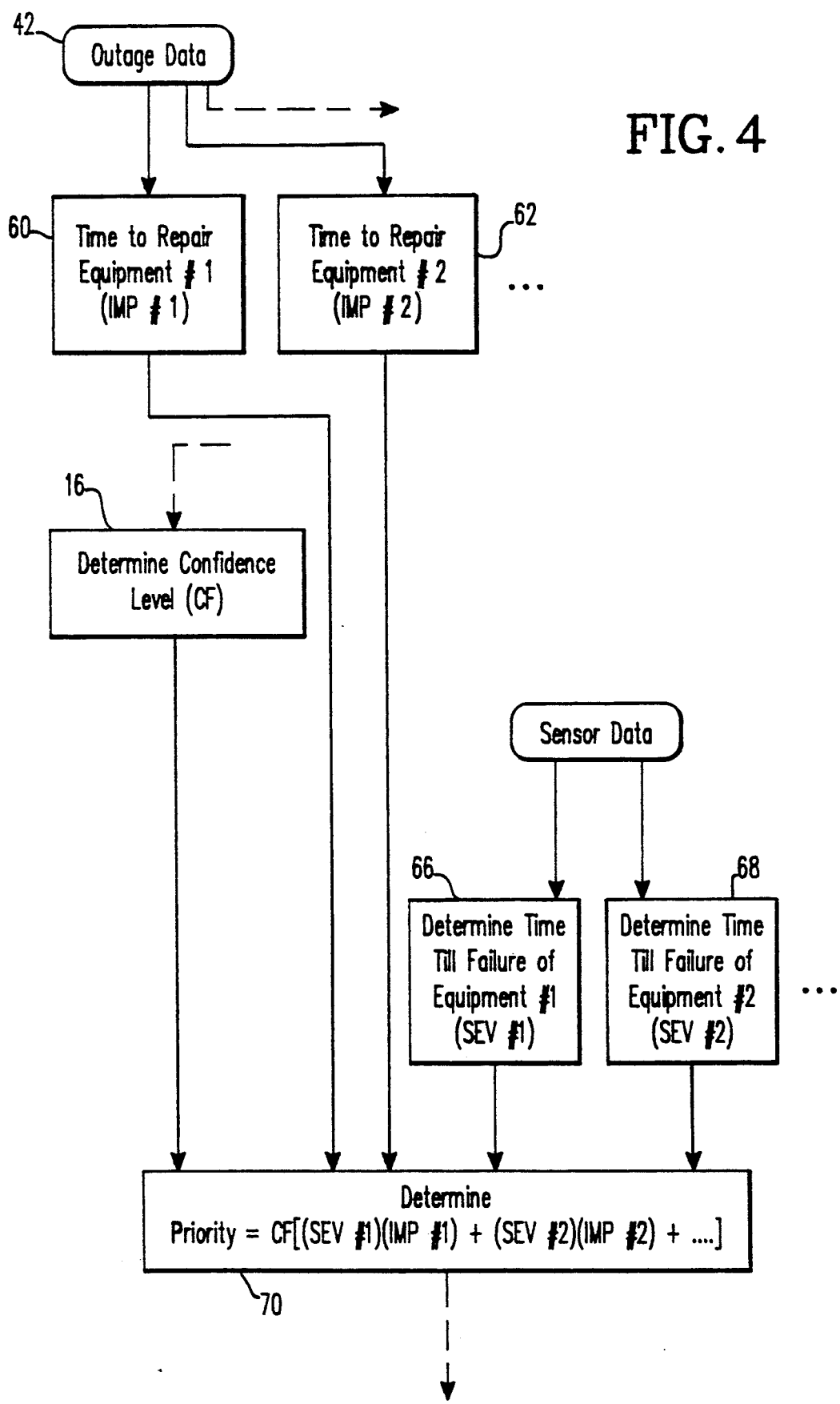
FIG. 4 illustrates another portion of the present invention that prioritizes repair of a malfunction which leads to multiple consequential equipment malfunctions.

In situations where a single malfunction can have several consequences, the individual importance (IMP) and severity (SEV) of each affected piece of equipment is multiplied, the multiplication results are summed and the sum is multiplied by the confidence factor (CF) in the malfunction diagnosis. For example, high oxygen in feedwater can damage the feedwater heaters. If the oxygen content is really high it may also cause damage in the boiler. In this situation the priority of fixing the high oxygen malfunction is the severity (SEV) times the importance (IMP) associated with the feedwater heaters plus the severity (SEV) times the importance (IMP) of the malfunction associated with the boiler, the sum being multiplied by the confidence factor (CF) in the diagnosis of the high oxygen malfunction. FIG. 4 illustrates the process performed in this situation.

The outage data 42 is used to obtain (60 and 62) the time to repair of each piece of equipment, for example, the time to repair (IMP #1) equipment no. 1 which corresponds to the feedwater heaters and the time to repair (IMP #2) equipment no. 2 which corresponds to the boiler. To repair a feedwater heater, it must be taken out of service, but the rest of the plant can remain online. Since the plant can operate with a feedwater heater out of service, its effect on capacity must be converted into equivalent outage time. The importance (IMP) of the most significant (highest temperature) feedwater heater being out of service is about 0.5% increase in the cost of running the plant, or about the same loss in capacity for running with constant heat input. This is almost negligible in the short term, being about 15 minutes for a two days of the feedheater out of service. The boiler tube leak will cost an outage of 3 days on the average. This far outweighs the feedwater heater importance.

As before, the sensor data 10 around the equipment suffering consequential damage is used to determine the severity (SEV). A severity 66 is determined for each piece of equipment being damages. These severities 66 and 68 are again modulated by the belief that the sensors are providing accurate data. In the example of high oxygen, the oxygen and ammonia values are used to estimate corrosion rates and time to failure in the feedwater heaters. At the same time, the corrosion rate is used to estimate the time to boiler tube failure based on transfer of the corrosion product to the boiler in the form of deposits. The deposits reduce heat transfer and cause boiler tube failure by overheating of the tube.

The priority is then determined 70. Once the priority of the malfunction is determined, the malfunctions are sorted in accordance with priority as previously discussed with respect to FIG. 3. As a result the list of malfunctions not only include the separate malfunction associated with the failure of the feedwater heater and separate malfunction associated with the boiler, but also the combined malfunction associated with the high feedwater oxygen content. These malfunctions would thus be on a common scale, thereby allowing them to be compared.

Figure 5:
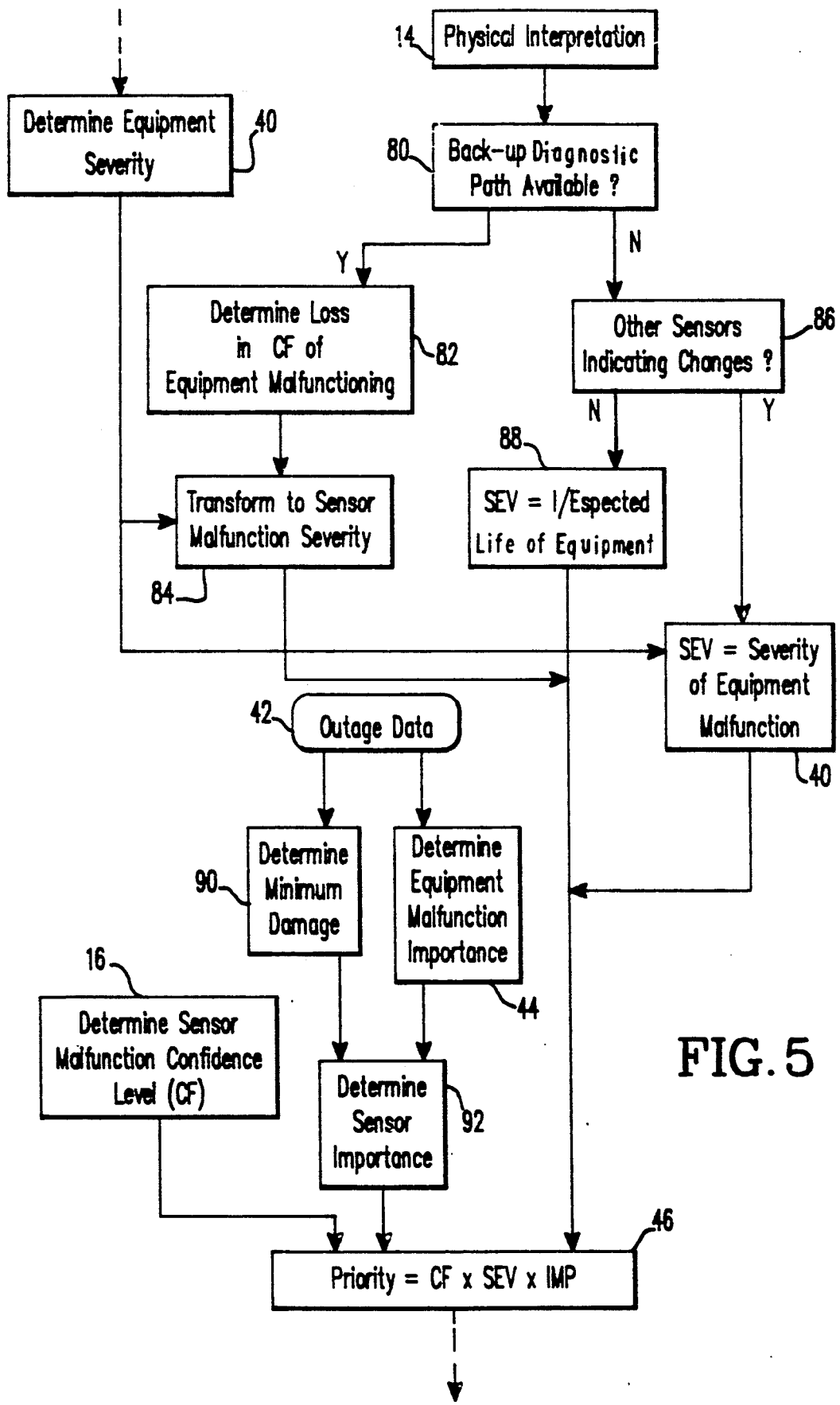
FIG. 5 depicts a further segment of the present invention that prioritizes sensor repair.

FIG. 5 illustrates how the priority associated with repairing a sensor is determined on the same scale as the previously discussed malfunctions. Many sensors are easy to diagnose as failed because they fail hard, that is the sensor either shorts or opens. As a result the confidence factor (CF) determined 16 for the sensor failure is very high and approaches +1. Chemical sensors on the other hand are particularly prone to failure due to loss of sensitivity or miscalibration. In determining the priority of repairing a sensor the severity associated with the loss must be determined. First, a determination 80 is made as to whether a backup diagnostic path is available. A rule which will determine whether a backup path is available for a sodium feedwater sensor is set forth below.

| | |
|---|---|
| CONTEXT: | always |
| EVIDENCE: | ( < sen-mal-Na-F 0 sf-backup-OK ) |
| HYPOTHESIS: | backup-Na-PE-OK |
| SF: | 1 |
| NF: | 1 |
| DESCRIPTION: | if there is less than 0 confidence that the feedwater sodium sensor is malfunctioning, then it is presumed correct. It is the backup sensor for the polisher effluent sodium sensor. |

The sensor malfunction severity in the backup case is determined by the loss in sensitivity in the diagnosis of the malfunction of the equipment being sensed. That is, the severity is dependent on the loss in the confidence factor in diagnosing that the equipment is malfunctioning and as a result must be determined. The determination 82 of the loss in the confidence factor is made in accordance with the equations below:

$$CF_{M1} = ABS(CF_{WO/S1} - CF_{S1MAX})$$

$$CF_{M2} = ABS(CF_{WO/S1} - CF_{S1MIN})$$

$$CF = MAX(CF_{M2}Y, CF_{M1})$$

, where $CF_{S1MAX}$ is the confidence factor associated with the maximum reading the malfunctioning sensor produces, $CF_{S1MIN}$ is the confidence factor associated with the minimum reading and $CF_{WO/S1}$ is the confidence factor in the malfunction with the sensor completely absent. Rules which determine the sensor confidence factor at maximum ($CF_{S1MAX}$) and at minimum ($CF_{S1MIN}$) and the confidence factor at total sensor loss ($CF_{WO/S1}$) can be produced by setting the sensor input to the rule base to limiting values (max and min) and limiting slopes, determining the confidence factor at these limiting values, and setting the confidence factor at the value determined without the sensor.

Once the loss in confidence factor is determined it must be transformed 84 into sensor malfunction severity. This transformation is made in accordance with the equation below:

Sensor SEV = (Equipment Severity) (CF)

Whenever, a backup diagnostic path does not exist, the system determines 86 whether other sensors in the system are indicating a change is the state of the equipment being monitored by the malfunctioning sensor. For instance, if the sodium sensors on both the polisher effluent and the feedwater were to simultaneously fail, there is no further backup. Under those conditions, the severity of the malfunction of the sodium sensor on the polisher effluent is the expected time to polisher exhaustion. This expected time is based on the condensate sodium and ammonia, and the time since polisher regeneration. However, if other sensors monitoring the condensate polishers, such as the specific conductivity and the acid cation exchanged conductivity, were to start to change, the severity of the malfunction of the sodium sensor increases to a value equal to the worst case damage to which one is blind without the sensor, which in this case is the severity of boiler damage due to caustic gouging at the maximum value of the sensor (1000 ppb). The use of the maximum equipment severity is extremely conservative. An extension of this method is to provide better estimates than the equipment severity at maximum sensor value by estimating the sensor value.

To determine the importance (IMP), the outage data 42 is accessed to determine 90 the minimum damage. The outage data is also used to determine 44 the importance of the equipment malfunction. The importance of the equipment malfunction determination is the same determination 44 discussed with respect to FIG. 3. From the minimum damage and the equipment malfunction importance, the sensor importance is determined 92. A simple example of the sensor importance calculation is how to determine the importance of a temperature sensor in a car when it fails. When the temperature sensor fails, it is impossible to diagnose a water pump failure which could result in the engine becoming over heated requiring engine replacement. As a result the importance of water pump failure is the cost of the repair associated with replacing an engine. If the sensor is repaired, a person would be able to intervene and repair the pump, so that the engine replacement would not be necessary. As a result the importance of the sensor is the cost of engine replacement minus the cost of the pump repair. The priority of the sensor malfunction is then determined in the same way as in FIG. 3.

Figure 6:
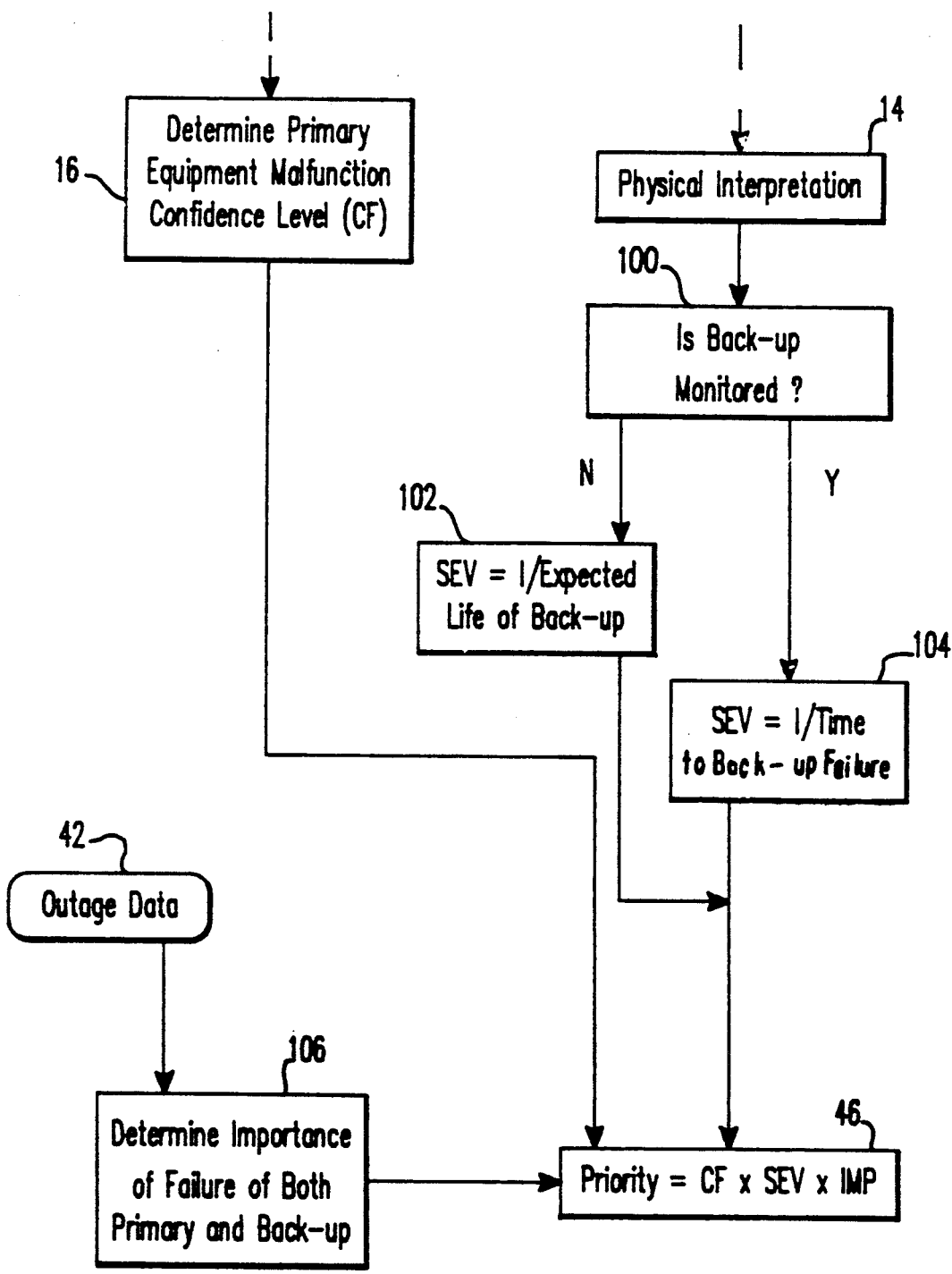
FIG. 6 shows how the repair of backed up equipment is prioritized.

To determine the prioritization of repair of backed up equipment on the same common scale as the sensors and the primary equipment the process illustrated in FIG. 6 is performed. The confidence level (CF) is determined 16 for the malfunction associated with the primary equipment. The physical interpretation of the sensor data 14 is used to determined 100 whether the backup piece of equipment is monitored, by determining if sensors are designated for backup equipment. If the backup is not monitored, the severity (SEV) is set 102 as the reciprocal of the expected life of the backup equipment. If the backup is monitored the severity (SEV) is the reciprocal of the estimated time until the backup fails. The importance 106 of the repair of the backup equipment is the importance of the failure of both the primary and backup equipment which is the importance of the failure of the primary equipment as if the primary equipment is not backed up. That is, the importance (IMP) is the same for both pieces of equipment, it is the importance of simultaneous failure of both the primary and backup. Once the confidence factor (CF), severity (SEV) and importance (IMP) are determined, the priority can be calculated as previously discussed and the malfunction associated with the backup equipment ranked on the same scale as the primary equipment and the sensors.

Even though the implementation of the priority scheme discussed above is directed at prioritizing malfunctions, the priority scheme can be used for any condition. For example, the malfunction could result in a recommendation and the recommendation could inherit the priority of the malfunction. As a result the display would be prioritized recommendations for repair rather than prioritized malfunctions. In addition, the priority scheme could be extended to procedures which are recommendations for the collection of additional information.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What we claim is:

1. A method of determining the priority of repair of malfunctioning equipment components in a system, comprising the steps of:
   (a) sensing a state of the equipment components using sensing mans and a computer;
   (b) diagnosing, using the computer, malfunctions of the equipment components from the state and determining a confidence level in each diagnosis; and
   (c) determining a severity of the malfunctions and an importance of the equipment components and ranking, using the computer, the malfunctions in the priority of repair in accordance with the severity of the malfunction, the importance of the equipment components and the confidence level.

2. A method as recited in claim 1, wherein step (c) includes the steps of:
   (c1) determining a priority of each malfunction as a product of the confidence level, the severity and the importance; and
   (c2) sorting the malfunctions based on priority.

3. A method as recited in claim 1, wherein step (c) includes the steps of:
   (c1) determining the severity of each component of equipment affected by the malfunction;
   (c2) determining the importance of each component of equipment affected by the malfunction;
   (c3) obtaining respective products of the severity and importance of the equipment components;
   (c4) summing the products to produce a sum;
   (c5) obtaining a priority of each malfunction as the product of the confidence level and the sum; and
   (c6) sorting the malfunctions based on priority.

4. A method as recited in claim 1, wherein the importance is the cost of repairing the component and the severity is reciprocal of the time until the component fails.

5. A method as recited in claim 1, wherein said system is monitored by sensors and one of the sensors is malfunctioning and step (c) comprises the steps of:
   (c1) determining a loss in confidence level caused by the malfunctioning sensor and converting the loss into malfunction severity when the component malfunction can be diagnosed by an alternate diagnostic path;
   (c2) determining the severity when the alternate diagnostic path does not exist;
   (c3) determining sensor importance as a function of minimum system damage and component malfunction importance;
   (c4) determining a priority as a product of the confidence level, severity and importance; and
   (c5) sorting the malfunctions based on priority.

6. A method as recited in claim 5, wherein step (c2) comprises the steps of:
   (i) determining whether other sensors are indicating changes;
   (ii) setting the severity as an inverse of expected component life when the other sensors do not indicate changes; and
   (iii) setting the severity as an inverse of the estimated time to failure of the component with the malfunction being diagnosed continuing.

7. A method as recited in claim 1, wherein the component has a backup and step (c) comprises the steps of:
  (c1) determining the importance of a combined failure of the component and the backup;
  (c2) determining the severity as a reciprocal of an expected life of the backup when the backup is not monitored;
  (c3) determining the severity as the reciprocal of the estimated time to failure of the backup when the backup is monitored;
  (c4) determining a priority as a product of the confidence level, severity and importance; and
  (c5) sorting the malfunctions based on priority.

8. A method of determining the priority of repair of malfunctioning equipment components in a system, comprising the steps of:
  (a) sensing a state of the equipment components using sensing means and a computer;
  (b) diagnosing, using a computer, malfunctions of the equipment components from the state and determining a confidence level in each diagnosis; and
  (c) determining a severity of the malfunctions and ranking, using the computer, the malfunctions in the priority of repair in accordance with severity of the malfunction and each confidence level.

9. A method of determining the priority of repair of malfunctioning equipment components in a system, comprising the steps of:
  (a) sensing a state of the equipment components using sensing means and a computer;
  (b) diagnosing, using a computer, malfunctions of the equipment components from the state and determining a confidence level in each diagnosis; and
  (c) determining an importance of the equipment components and ranking, using the computer, the malfunctions in the priority of repair in accordance with the importance of the equipment components and the confidence level.

10. A system for determining the priority of repair of malfunctioning equipment components in a system, comprising:
  sensors for determining a state of the equipment components; and
  a computer connected to said sensors and comprising:
    diagnosis means for diagnosing malfunctions of the equipment components in dependence on the state and determining a confidence level in each diagnosis;
    severity means for determining a severity of the malfunctions;
    importance means for determining an importance of the equipment components; and
    prioritizing means for ranking the malfunctions in the priority of repair in accordance with the severity of the malfunctions, the importance of the equipment components and the confidence level.

11. A system for determining the priority of repair of malfunctioning equipment components in a system, comprising:
  sensors for determining a state of the equipment components; and
  a computer connected to said sensors and comprising:
    diagnosis means for diagnosing malfunctions of the equipment components in dependence on the state and determining a confidence level in each diagnosis;
    severity means for determining a severity of the malfunctions; and
    prioritizing means for ranking the malfunctions in the priority of repair in accordance with the severity of the malfunction and the confidence level.

12. A system for determining the priority of repair of malfunctioning equipment components in a system, comprising:
  sensors for determining a state of the equipment components; and
  a computer connected to said sensors and comprising:
    diagnosis means for diagnosing malfunctions of the equipment components in dependence on the state and determining a confidence level in each diagnosis;
    importance means for determining an importance of the equipment components; and
    prioritizing means for ranking the malfunctions in the priority of repair in accordance with the importance of the equipment components and the confidence level.

13. A method of determining the priority of repair of malfunctioning equipment components in a power plant, comprising the steps of:
  (a) sensing a state of the components using sensing means and a computer;
  (b) diagnosing malfunctions of the components from the state and determining a confidence level in each diagnosis using a computer; and
  (c) determining severity of the malfunction and importance of the component and ranking, using the computer, the malfunctions in accordance with the severity of the malfunction, the importance of the component and the confidence level, wherein:
  step (c), when a single component is malfunctioning, no sensors are malfunctioning and no backup component exists, includes the steps of:
    (1) determining a priority of each malfunction as a product of the confidence level, the severity and the importance; and
    (2) sorting the malfunctions based on priority;
  step (c), when several components are affected by a malfunction, includes the steps of:
    (3) determining the severity of each component of equipment affected by the malfunction;
    (4) determining the importance of each component of equipment affected by the malfunction;
    (5) obtaining respective products of the severity and importance of the components of equipment;
    (6) summing the products to produce a sm;
    (7) obtaining the priority of each malfunction as a product of the confidence level and the sum; and
    (8) sorting the malfunctions based on priority;
  step (c), when said system is monitored by sensors and one of the sensors is malfunctioning comprises the steps of:
    (9) determining a loss in confidence level caused by the malfunctioning sensor and converting the loss into malfunction severity when the component malfunction can be diagnosed by an alternate diagnostic path;
    (10) determining the severity when the alternate diagnostic path does not exist;
    (11) determining sensor importance as a function of the minimum system damage and the component malfunction importance;
    (12) determining the priority as a product of the confidence level, severity and importance; and

(13) sorting the malfunctions based on priority; and step (c), when the component as a backup, comprises the steps of:

(14) determining the importance of the combined failure of the component and the backup

(15) determining the severity as a reciprocal of an expected life of the backup when the backup is not monitored;

(16) determining the severity as the reciprocal of the estimated time to failure of the backup when the backup is monitored;

(17) determining the priority as a product of the confidence level, severity and importance; and

(18) sorting the malfunctions based on priority.

* * * * *